(12) United States Patent
Freeman et al.

(10) Patent No.: US 6,925,570 B2
(45) Date of Patent: Aug. 2, 2005

(54) METHOD AND SYSTEM FOR SETTING A SECURE COMPUTER ENVIRONMENT

(75) Inventors: Joseph Wayne Freeman, Raleigh, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 09/858,058

(22) Filed: May 15, 2001

(65) Prior Publication Data

US 2002/0174342 A1 Nov. 21, 2002

(51) Int. Cl.$^7$ ............................................. G06F 17/00
(52) U.S. Cl. ........................ 713/200; 713/192; 713/2
(58) Field of Search ................................ 713/189–194, 713/1, 2, 200–202

(56) References Cited

U.S. PATENT DOCUMENTS

| | | | |
|---|---|---|---|
| 5,446,904 A | 8/1995 | Belt et al. | 395/750 |
| 5,850,562 A | 12/1998 | Crump et al. | 395/800 |
| 5,978,584 A | 11/1999 | Nishibata et al. | 395/704 |

OTHER PUBLICATIONS http://www.infineon.com/cmc_upload/documents/029/213/SPI_SLE11C001SU_1001.pdf.*
http://www.arm.com/miscPDFs/4498.pdf.*
http://www.academicsuperstore.com/market/marketdisp.html?PartNo=719247.*
Suh et al., Security: Secure program execution via dynamic information flow tracking, Oct. 2004 Proceedings of the 11th international conference on Architectural support for programming languages and operating systems.*
Smart–cards–a cost–effective solution against electronic fraud Lassus, M.; Security and Detection, 1997. ECOS 97., European Conference on, Apr. 28–30, 1997.*
On the hardware design for DES cipher in tamper resistant devices against differential fault analysis Lih–Yang Wang; Chi–Sung Laih; Hang–Geng Tsai; Nern–Min Huang; Circuits and Systems, 2000. Proceedings. ISCAS 2000 Geneva. The 2000 IEEE International Symp.*

* cited by examiner

*Primary Examiner*—David Jung
(74) *Attorney, Agent, or Firm*—Richard F. Frankeny; Winstead Sechrest & Minick P.C.; George Grosser

(57) ABSTRACT

A computer system processor incorporates a special S-latch which may only be set by secure signals. One state of the S-latch sets the processor into a secure mode where it only executes instructions and not commands from an In Circuit Emulator (ICE) unit. A second state of the S-latch sets the processor into a non-secure mode. A non-volatile random access memory (NVRAM) is written with secure data which can only be read by boot block code stored in a BIOS storage device. The boot block code is operable to read the secure data in the NVRAM and set the S-latch to an appropriate security state. If the boot block code cannot set the S-latch, then remaining boot up with BIOS data is stopped. On boot up the boot block code reads the NVRAM and sets the S-latch into the appropriate security state.

26 Claims, 3 Drawing Sheets

METHOD AND SYSTEM FOR SETTING A SECURE COMPUTER ENVIRONMENT

TECHNICAL FIELD

The present invention relates in general to methods of ensuring a secure computing environment which prevent hardware devices from being connected to a computer system and compromising sensitive information.

BACKGROUND INFORMATION

An In Circuit Emulator (ICE) is a class of device that may be connected to a computer system either in place of a socketed device or via a communication port (e.g., Joint Test Action Group (JTAG) port) which allows a knowledgeable person to send commands to the processor and other devices. These commands may start and stop operations as well as gain access to registers and data stored in memory. ICE units may reset the processor, start and stop program execution, display and modify processor registers, download code, etc. Because of the power of these devices, they may be connected to a system and a knowledgeable person may gain access to sensitive information transparent to the operation of an application program. ICE devices may also monitor bus activity of the processor and store information triggered by logic signals within the system.

One of the major points of contention in creating a trusted computing environment using modern personal computers (PCs) is that all the code may be defeated by using an ICE unit. The ICE unit may be used to gain access to a system transparent to the software operating on the PC. This may allow a knowledgeable person to gain access to secrets and bypass security measures. Measures could be employed that prevent an ICE unit from ever being used in conjunction with a PC. However, this would defeat the need for such systems in the manufacturing environment or in debugging difficult application problems.

Therefore, there is a need for a method and apparatus that would prevent the use of an ICE device when a secure environment was necessary and to enable the use of an ICE device in a manufacturing or non-secure environment.

SUMMARY OF THE INVENTION

A computer system has a BIOS storage device with both read only and read/write storage locations. The read-only locations contain boot block code that is executed first after any power up or system reset of the computer system. A non-volatile random access memory (NVRAM) is written with data indicating a desired security state for the computer system. This NVRAM can be locked such that a non-BIOS application cannot access it. Processors used within the computer system are modified to incorporate a special latch that may be written and read with special code in the boot block code. This special S-latch indicates to the processor(s) its security state. This latch, once written, cannot be reset by a later application until a power on reset. If the processor is in the secure state (which is the power on default), it will not accept ICE commands and will only execute instructions. On power up or system reset, the boot block code reads the programmed security mode from the NVRAM and sets the state of the special S-latch in the system processor(s). If it is desired to use an ICE unit during manufacturing or a diagnostic operation, security hardware can write the correct security code into the NVRAM. Boot block code will then authenticate the security data and set the special S-latch so the system processor is in the correct security mode. If the latch is set to the secure state, the processor will internally block all ICE activity until reset. The processor will also have special registers which indicate whether this function is supported. If a system processor is socketed, and an ICE unit is connected in place of the system processor, an application can determine this via the fact that the special register is not set correctly. This register can be read via special CPU instructions to ensure a secure method of determining whether an ICE is supported.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
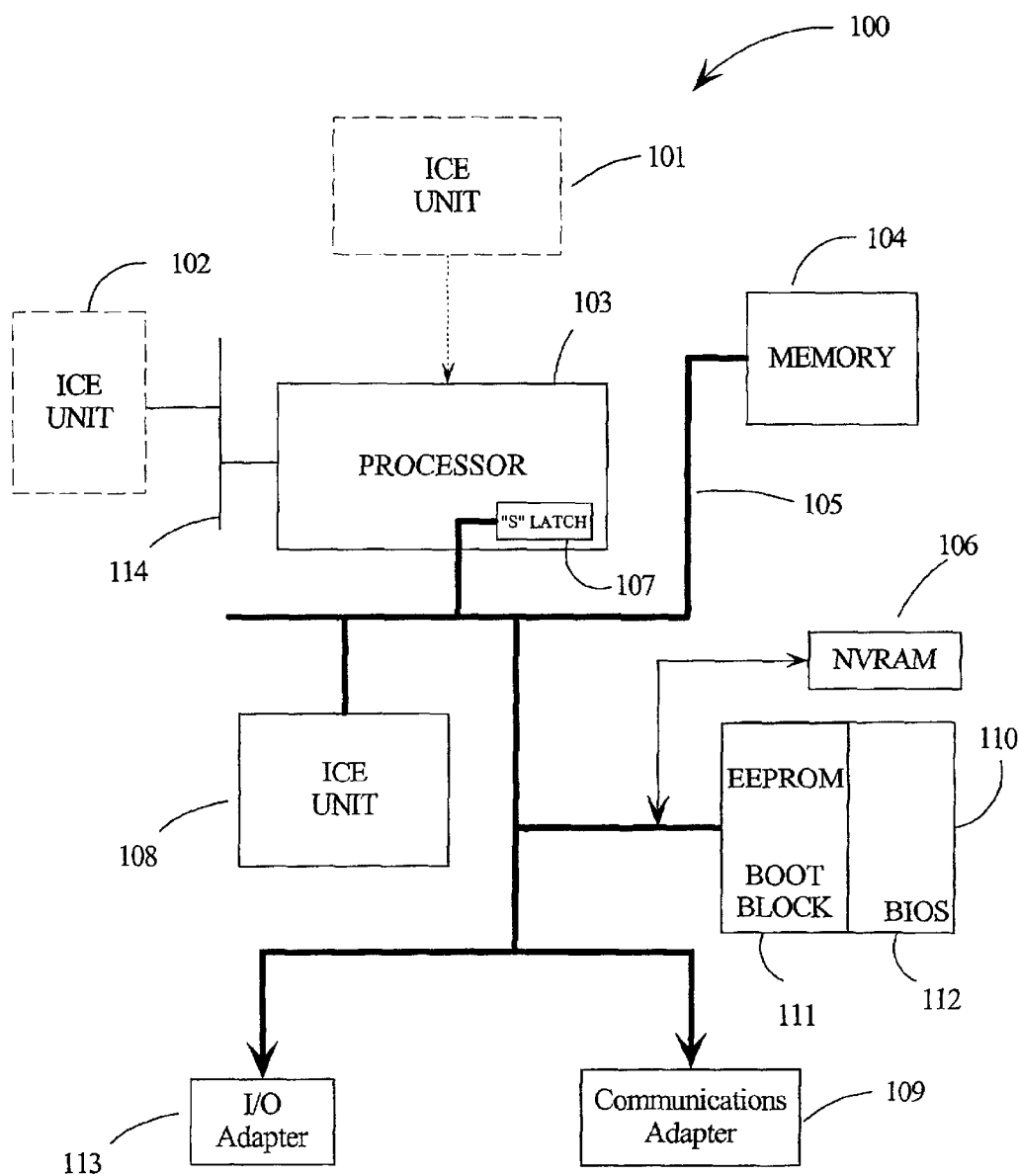
FIG. 1 is a block diagram of a processor and system elements according to embodiments of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. In the following description, the terms packet and frame may be used interchangeably as a fixed block of data transmitted as a single entity.

The Basic Input Output System (BIOS) code is an essential set of routines in a personal computer (PC) or other computer system which is stored within the computer system and provides an interface between the operating system and the hardware. The BIOS code supports all peripheral technologies and internal services such as the realtime clock (time and date). On startup, the BIOS tests the system and prepares the computer for operation by querying its own small memory bank for peripheral drive and other configuration settings. It searches for other BIOS's on the plug-in boards and sets up pointers (interrupt vectors) in memory to access those routines. It then loads the operating system and passes control to it. The BIOS accepts requests from the peripheral drivers as well as the application programs. BIOS's must periodically be updated to keep pace with new peripheral technologies. If the BIOS is stored in a read-only memory (ROM) chip (ROM BIOS), then to update the ROM chip must be replaced. In newer systems, BIOS data is stored on a flash memory chip that can be upgraded via software.

A part of the BIOS that has enough information to do validity checks on some system elements and enable the loading of additional BIOS information is sometimes called the "boot block" code. The boot block would normally be a protected portion of the BIOS storage device (e.g., EEPROM) which may not be erasable or rewritten. This boot block code would have sufficient functionality to determine if essential features of the system were at a desired level and to take action to correct deficiencies. Embodiments of the present invention use a modified boot block code to facilitate blocking an ICE unit access or allowing an ICE unit access when desired.

FIG. 1 is a block diagram of elements of a computer system 100 according to embodiments of the present invention. Processor 103 is connected with other system elements with system bus 105. Processor 103 also contains "sticky" (S) latch 107. The term "sticky" is applied to S-latch 107 because it is a latch that may be set and reset only with special controls. The state of S-latch 107 is used to determine an operational characteristic for processor 103. In embodiments of the present invention, S-latch 107 is a modification to processor 103 and its state determines whether processor 103 will accept commands from an In Circuit Emulator (ICE) (e.g., 101, 102, or 108) or will only execute instructions. Processor 103 communicates with memory 104, electrically erasable programmable read-only memory (EEPROM) 110, I/O adapter 113, and communication adapter 109 over system bus 105. EEPROM 110 contains BIOS code 112 and boot block code 111. While boot block code 111 is part of the BIOS code 112, it has some important exceptions. Boot block code 111 is protected and read-only and it is the first code executed after a power up or system rest of system 100. Non-volatile random access memory (NVRAM) 106 may be written with secure data from bus 105 (e.g., from an external device via communication adapter 109), however, the validity of the secure data is determined by fixed code in boot block code 111. For example, the secure data in NVRAM 106 may be encrypted so only an authorized external device or boot block code 111 is able to read and authenticate the data. If computer system 100 is to operate in a secure programming environment, then NVRAM 106 is written with data that indicates the secure programming mode. On power up or after a system reset, boot block code 111 is the first code executed with instructions that read secure data of NVRAM 106 indicating the system 100 secure programming mode. Instructions in boot block code 111 also write data to S-latch 107, the data in turn sets processor 103 into the desired secure or non-secure programming mode. When processor 103 is in the secure programming mode, it will not accept commands from an ICE unit (e.g., ICE 101, 102, or 108).

ICE units may be connected to computer system 100 in a variety of ways. In FIG. 1, ICE unit 108 is shown attached to system bus 105 and ICE unit 102 is shown attached to a JTAG bus 114. In this manner an ICE unit may execute a variety of system commands that could compromise system 100 if it required a secure operation mode. If processor 103 is connected to system 100 via a socket, then an ICE unit 101 may also be connected to system 100 as a replacement for processor 103. This also allows an unauthorized user to execute commands that may compromise operations of an application program that was sending and receiving information over communication adapter 109 or to I/O devices via I/O adapter 113. Embodiments of the present invention prevent ICE units (e.g., 101, 102 or 108) from operating within system 100 unless so authorized.

If ICE units 102 or 108 are connected to system 100 and a secure programming environment is desired, then secure data is written into NVRAM 106 indicating that a secure mode is desired. On power up or a reset, boot block 111 will read the data indicating the desire secure mode and send data to processor 103 which is stored in S-latch 107. The secure mode data in S-latch 107 will in turn set processor 103 to ignore any ICE commands from ICE unit 102 or 108 over their respective connection buses 112 and 105. If ICE unit 101 is connected in place of processor 103, then there may not be an S-latch 107 which boot block code 111 expects to "see" when it executes its code after a power up or a system reset. When boot block code 111 determines that it cannot set the security state of processor 103 it will flag a system error and not allow system 100 to boot up using the remainder of BIOS code 112.

By modifying processors used in system 100 to require an S-latch 107 and by incorporating secure and protected boot block code 111 in the BIOS 112 storage device (EEPROM) 110, embodiments of the present invention prevent unauthorized use of ICE devices from comprising a secure operation mode for system 100. Since NVRAM 106 can be programmed with desired security mode data, the flexibility of setting system 100 into a non-secure mode during its manufacturing or diagnostic operations is retained.

Figure 2:
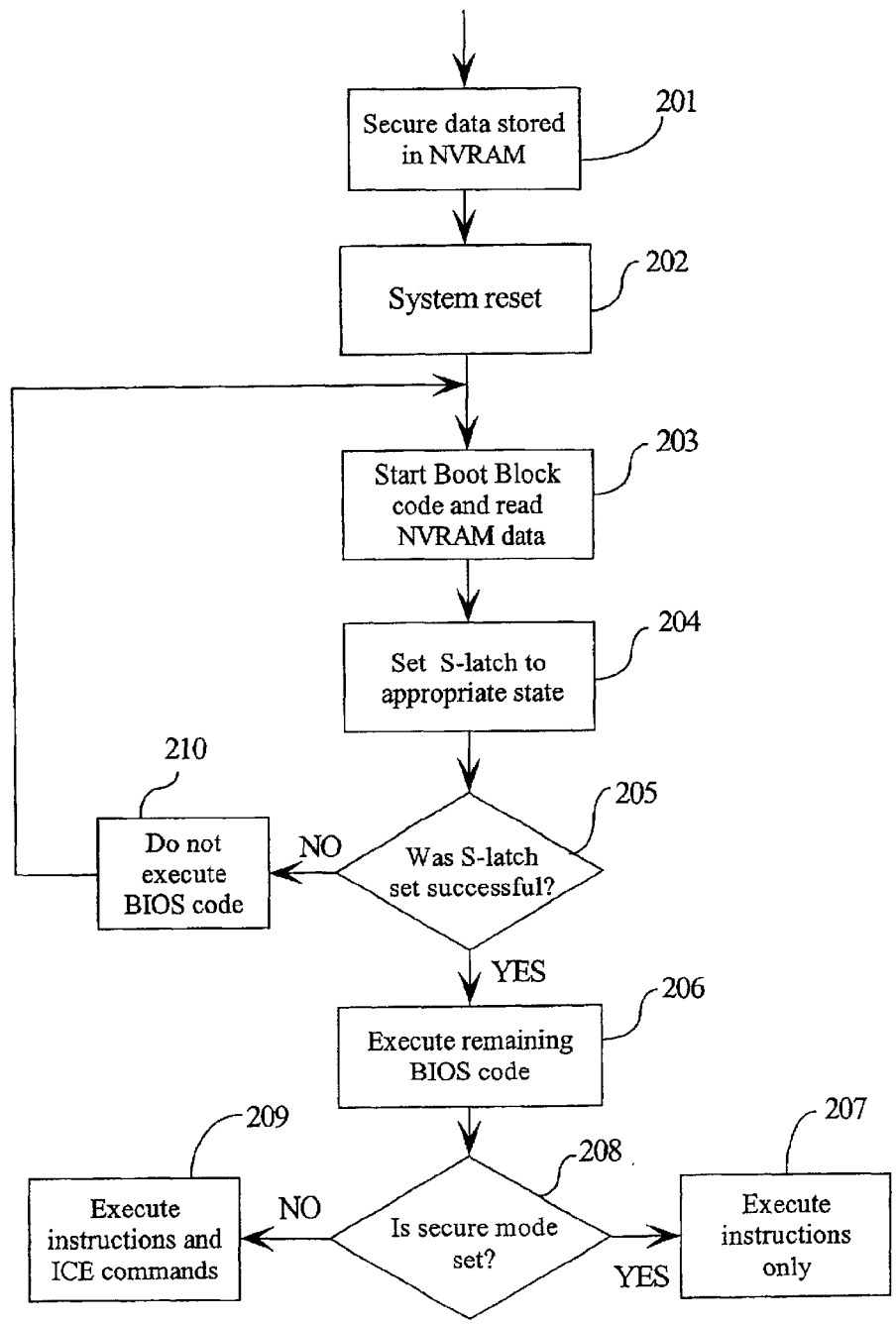
FIG. 2 is a flow diagram of method steps in embodiments of the present invention.

FIG. 2 is a flow diagram of a method of providing a secure programming environment for a computer system 100 according to embodiments of the present invention. In step 202, system 100 is reset. In step 203, the boot block code 111 execution starts and the NVRAM data is read. In step 204, the boot block code 111 sets the S-latch 107 in the processor 103 to the state indicated by the secure data in the NVRAM 106. In step 205, a test is done to determine if the S-latch 107 was set successfully. If the result of the test in step 205 is NO, then remaining BIOS code 112 is not executed in step 210 and return is executed to step 203. If the result of the test in step 205 is YES, then in step 206 the remaining BIOS code 112 is executed. In step 208, a test is done to determine if the secure mode is set into the S-latch 107. If the result of the test in step 208 is NO, then the secure mode is not set and instructions are executed in the processor 103, or processor 103 may execute commands from a connected ICE unit 102 or 108 in step 209. If the result of the test in step 208 is YES, then in step 207 only instructions are executed.

Figure 3:
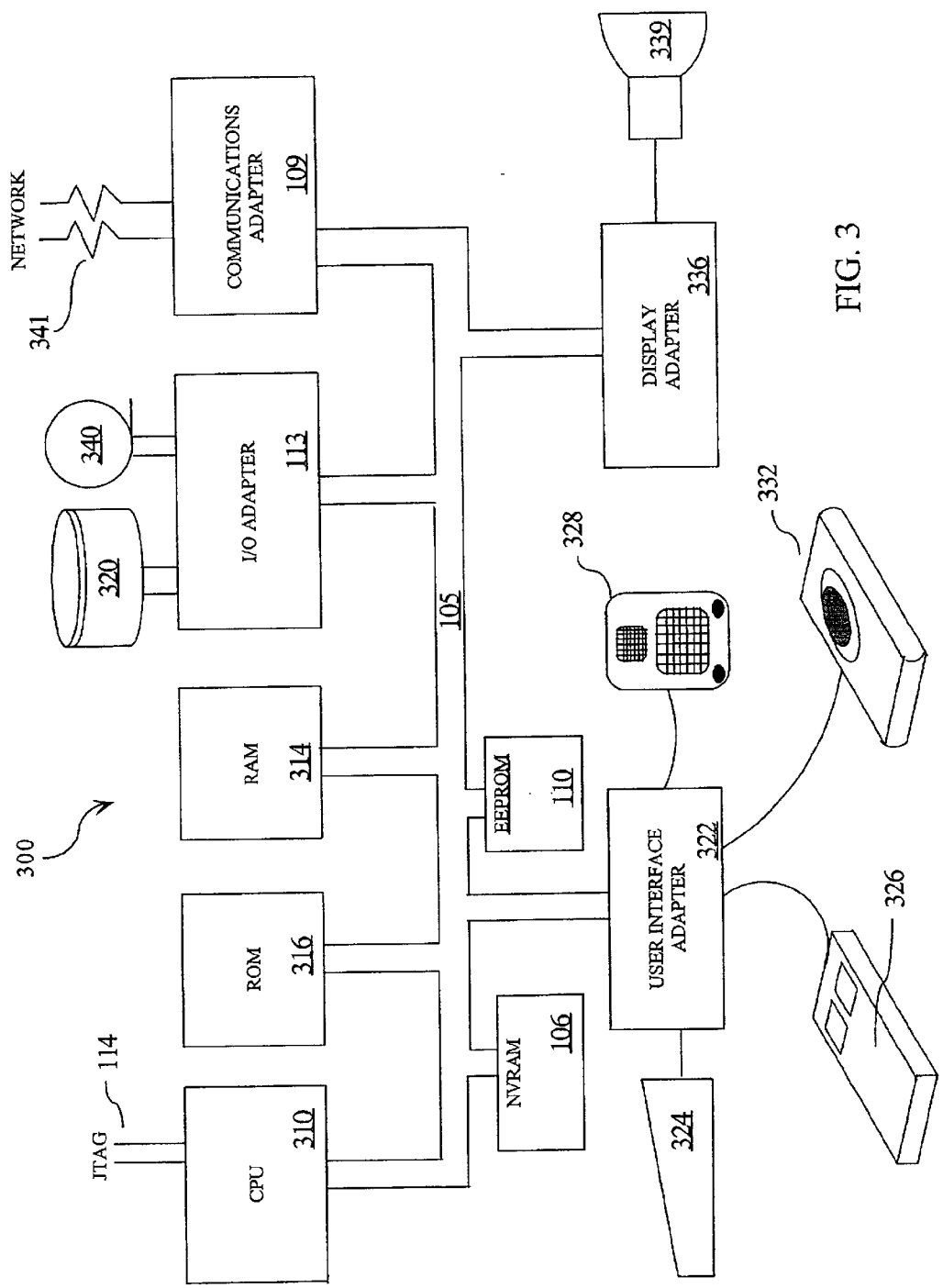
FIG. 3 is a block diagram of a data processing system which may have a secure programming environment according to embodiments of the present invention.

FIG. 3 is a high level functional block diagram of a representative data processing system 300 suitable for practicing the principles of the present invention. Data processing system 300 includes a central processing system (CPU) 310 operating in conjunction with a system bus 105. System bus 105 operates in accordance with a standard bus protocol compatible with CPU 310. CPU 310 operates in conjunction with an electronically erasable programmable read-only memory (EEPROM) 110, non-volatile random access memory (NVRAM) 106 and random access memory (RAM) 314. Among other things, EEPROM 110 supports storage of the Basic Input Output System (BIOS) code 112 and boot block code 111. RAM 314 includes DRAM (Dynamic Random Access Memory) system memory and SRAM (Static Random Access Memory) external cache. I/O Adapter 113 allows for an interconnection between the devices on system bus 105 and external peripherals, such as mass storage devices (e.g., an IDE hard drive, floppy drive or CD/ROM drive), or a printer 340. A peripheral device 320 is, for example, coupled to a peripheral control interface (PCI) bus, and I/O adapter 113 therefore maybe a PCI bus bridge. User interface adapter 322 couples various user input devices, such as a keyboard 324, mouse 326, touch pad 332 or speaker 328 to the processing devices on bus 312. Display 339 which may be, for example, a cathode ray tube (CRT), liquid crystal display (LCD) or similar conventional display units. Display adapter 336 may include among other things a conventional display controller and frame buffer memory. Data processing system 300 may be selectively coupled to a computer or communications network 341 through communications adapter 109. Communications adapter 109 may include, for example, a modem for connection to a communication network and/or hardware and software for connecting to a computer network such as a local area network (LAN) or a wide area network (WAN). CPU 310 may employ a processor 103 modified with S-latch 107 according to embodiments of the present invention. In Circuit Emulator (ICE) units 102, 101, or 108 may be coupled to the data processing system on JTAG bus 114, system bus 105 or directly in place of processor 103 (refer to FIG. 1). NVRAM 106 is operable to store security code according to embodiments of the present invention. NVRAM 106 may be written from an external device (e.g., 320) via I/O adapter 113 or communications adapter 109.

Although the present invention and its advantages have been described in detail, it should be understood that various changes, substitutions and alterations can be made herein without departing from the spirit and scope of the invention as defined by the appended claims.

What is claimed is:

1. A method for ensuring a secure programming environment for a computer system comprising the steps:
   modifying a processor of said computer system to incorporate an S-latch, a first state of said S-latch setting said processor in a secure state and a second state of said S-latch setting said processor in a non-secure state;
   writing a security code in an NVRAM coupled to said computer system;
   reading said security code from said NVRAM;
   setting said first and second state of said S-latch in response to states of said security code; and
   not accepting processor commands from an In Circuit Emulator (ICE) unit coupled to said computer system when said S-latch is in said first state and accepting processor commands from said ICE unit when said S-latch is in said second state.

2. The method of claim 1, wherein said security code is read by boot block code within a Basic Input Output System (BIOS) code of said computer system.

3. The method of claim 2, wherein said S-latch is set by said boot block code in response to reading said security code.

4. The method of claim 2, wherein said boot block code is a first code executed on each power up or system reset of said computer system.

5. The method of claim 1, wherein said security code is encrypted when written into said NVRAM.

6. The method of claim 1, wherein said security code is password protected when written into said NVRAM.

7. The method of claim 2, wherein said BIOS code is executed if said boot block code is able to authenticate said security code and said boot block code is able to write to said S-latch if said security code corresponds to setting said first state of said S-latch.

8. The method of claim 2, wherein said BIOS code is not executed if said boot block code is not able to authenticate said security code.

9. The method of claim 2, wherein said BIOS code is not executed if said boot block code is able to authenticate said security code and said boot block code is not able to set a state of said S-latch.

10. The method of claim 1, wherein said ICE unit is coupled to said computer system on a system bus of said computer system.

11. The method of claim 1, wherein said ICE unit is coupled to said computer system on a JTAG scan chain bus.

12. The method of claim 1, wherein said ICE unit is coupled to said computer system in place of said modified processor.

13. The method of claim 1, wherein a default said S-latch in said computer system is set to a non-secure state.

14. A computer system comprising:
   a central processing unit (CPU);
   a random access memory (RAM);
   non-volatile RAM (NVRAM);
   a communications adapter coupled to a communication network;
   an I/O adapter;
   a bus system coupling said CPU to said NVRAM, said communications adapter, said I/O adapter, and said RAM, wherein said CPU further comprises:
   a modified processor with an S-latch, a first state of said S-latch setting said modified processor in a secure state and a second state of said S-latch setting said modified processor in a non-secure state;
   first circuitry operable to receive and write a security code in said NVRAM;
   second circuitry operable to read said security code from said NVRAM
   and operable to set said first and second state of said S-latch in response to states of said security code;

wherein said modified processor accepts commands from an In Circuit Emulator (ICE) unit coupled to said computer system when said S-latch is in said second state and does not accept processor commands from said ICE unit when said S-latch is in said first state.

15. The computer system of claim 14, wherein said security code is read by boot block circuitry within Basic Input Output System (BIOS) circuitry of said computer system.

16. The computer system of claim 15, wherein said S-latch is set by said boot block circuitry in response to reading said security code.

17. The computer system of claim 15, wherein said boot block circuitry reads said security code as a first operation on each power up or system reset of said computer system.

18. The computer system of claim 14, wherein said security code is encrypted when written into said NVRAM.

19. The computer system of claim 14, wherein said security code is pass word protected when written into said NVRAM.

20. The computer system of claim 15, wherein said BIOS circuitry is enabled if said boot block code is able to authenticate said security code and said boot block code is able to write to said S-latch if said security code corresponds to setting said first state of said S-latch.

21. The computer system of claim 15, wherein said BIOS circuitry is disabled if said boot block is not able to authenticate said security code.

22. The computer system of claim 15, wherein said BIOS circuitry is disabled if said boot block circuitry is not able to set said S-latch into a state.

23. The computer system of claim 14, wherein said ICE unit is coupled to said computer system on a system bus of said computer system.

24. The computer system of claim 14, wherein said ICE unit is coupled to said computer system on a JTAG scan chain bus.

25. The computer system of claim 14, wherein said ICE unit is coupled to said computer system in place of said modified processor.

26. The computer system of claim 14, wherein a default said S-latch in said computer system is set to a non-secure state.

* * * * *